United States Patent [19]
Lee et al.

[11] Patent Number: 5,914,918
[45] Date of Patent: *Jun. 22, 1999

[54] COMPACT DISC TRANSPORTER HAVING A CARRIAGE FOR TRANSPORTING COMPACT DISCS BETWEEN MOVEABLE ADDING BINS, A PRINTER AND A RECORDER

[75] Inventors: John S. Lee, Coon Rapids; Roger E. Haro, Eden Prairie; David Rother, Hastings; Donald Hollerich, Edina, all of Minn.

[73] Assignee: Rimage Corporation, Edina, Minn.

[ * ] Notice: This patent is subject to a terminal disclaimer.

[21] Appl. No.: 08/910,298

[22] Filed: Aug. 11, 1997

Related U.S. Application Data

[63] Continuation of application No. 08/579,927, Dec. 28, 1995, Pat. No. 5,734,629.

[51] Int. Cl.⁶ .................................................. G11B 17/22
[52] U.S. Cl. ............................................................. 369/34
[58] Field of Search ............................... 360/92; 369/30, 369/34, 35, 36, 37; 364/478.06, 478.03; 414/273, 274, 277, 281, 331, 225, 796.5, 908

[56] References Cited

U.S. PATENT DOCUMENTS

| | | | |
|---|---|---|---|
| 4,912,575 | 3/1990 | Shiosaki | 360/92 |
| 5,232,505 | 8/1993 | Novak et al. | 118/712 |
| 5,285,333 | 2/1994 | Barr et al. | 360/92 |
| 5,429,470 | 7/1995 | Nicol et al. | 414/331 |
| 5,498,116 | 3/1996 | Woodruff et al. | 414/331 |
| 5,518,325 | 5/1996 | Kahle | 400/70 |
| 5,543,001 | 8/1996 | Casillo et al. | 156/60 |
| 5,546,315 | 8/1996 | Kleinschnitz | 364/478.06 |
| 5,734,629 | 3/1998 | Lee et al. | 369/34 |

FOREIGN PATENT DOCUMENTS

| | | |
|---|---|---|
| 0528106 | 8/1991 | European Pat. Off. . |
| 2217107 | 10/1989 | United Kingdom . |
| WO95/07531 | 4/1995 | WIPO . |

OTHER PUBLICATIONS

"Kodak PCD Writer 600", Product Description and Specifications, Brochure from Eastman Kodak Company, 343 State Street, Rochester, NY 14650, Mar. 1995.

*Primary Examiner*—David D. Davis
*Attorney, Agent, or Firm*—Schwegman, Lundberg, Woessner, and Kluth, P.A.

[57] ABSTRACT

An apparatus for recording and verifying information recorded on compact disks and for printing label information on the disks, and a method of operating the apparatus, wherein the respective recorders, verifiers, and printers are vertically stacked in a housing, and a vertically movable carriage is arranged to transport compact disks to each of the stacked devices. A rotatable carousel is mounted to the housing beneath the carriage; the carousel having multiple bins for receiving and holding compact disks. A computer processor controls the actuation of the respective devices, the carriage, and the carousel, to sequentially process unrecorded compact disks through the steps of recording, verifying and printing, and to reject compact disks which have failed the verification tests. A camera may be connected to the housing and uses in conjunction with the computer processor to rotatably position a compact disk into a preferred position prior to the printing step.

21 Claims, 3 Drawing Sheets

COMPACT DISC TRANSPORTER HAVING A CARRIAGE FOR TRANSPORTING COMPACT DISCS BETWEEN MOVEABLE ADDING BINS, A PRINTER AND A RECORDER

This application is a continuation of U.S. patent application Ser. No. 08/579,927, filed Dec. 28, 1995. Now U.S. Pat. No. 5,734,629.

BACKGROUND OF THE INVENTION

The present invention relates to an apparatus for automating the processing steps required for producing multiple copies of compact disks with prerecorded information; more particularly, the invention relates to an apparatus for automatically loading a blank compact disk from an input bin to a transporter, transporting the compact disk to a recorder, recording data on the compact disk, transporting the disk to a reader, reading the data from the disk to verify the accuracy of the recording process, transporting the disk to a printer for printing label information onto the disk, and depositing the disk into either an output bin or a reject bin.

Compact disks (CDs) are plastic disks about 12 centimeters (cm) in diameter on which data may be recorded, usually by a stamping process or by a laser process where digital (binary) information is stored by selectively burning extremely small spots about circumferential tracks on the disk. The CD may typically receive its stored information one or more times, and it may be read by appropriate CD readers many times without harming or degrading the stored information. Such CDs are known as CD-R, which indicates that they are recordable CDs. In the context of the present invention, it is to be understood that reference to "CD" includes and preferably encompasses "CD-R". Since a very high density of information may be stored on a CD, it is capable of holding extremely large amounts of data, far exceeding the capabilities of magnetically recorded disks. CDs are typically manufactured in mass production quantities with prerecorded software programs, for commercial sale to users of computers and computer software.

The present invention speeds up and improves the steps involved in the manufacturing process for recording and preparing a CD by significantly reducing the number of manual handling steps required to record, verify and print label information on a CD.

SUMMARY OF THE INVENTION

The invention comprises a CD transporter which includes a rotatable carousel having at least three bins for holding CDs in some quantities, an elevator and CD gripper which is positionable over the carousel, one or more CD recorders and data verifiers vertically stacked adjacent the elevator, and a CD printer vertically positioned adjacent the elevator. A rotatable positioner may be used in conjunction with the printer, to rotate a CD into a preferred position prior to insertion into the printer. A control mechanism including position sensors activates the carousel and elevator to permit a blank CD to be lifted from a storage bin and successively or selectively transported to the recorder, the verifier and the printer for processing, and then placing the processed CD in an output bin on the carousel. A reject bin is provided for depositing a disk that does not pass the testing provided by the verifier.

It is a principal object and advantage of the present invention to provide an automation device for recording, verifying and printing label information on compact disks, as a part of a commercial manufacturing operation for such recordable disks.

It is another object and advantage of the invention to provide a sorting device wherein defective compact disks may be sorted separately from good disks and collected in a reject bin for subsequent disposal.

It is another object and advantage of the present invention to provide an automation device for selectively recording, verifying or printing label information on compact disks, in any order or sequence.

It is a further object and advantage of the present invention to provide a printing device for orienting a disk to a preferred rotational position for printing label information on a preselected area of the disk.

It is another object and advantage of the present invention to provide an apparatus for reading label information printed on a disk Other and further objects and advantages of the invention will become apparent from the following specification and claims and with reference to the drawings.

DESCRIPTION OF THE PREFERRED EMBODIMENT

Figure 1:
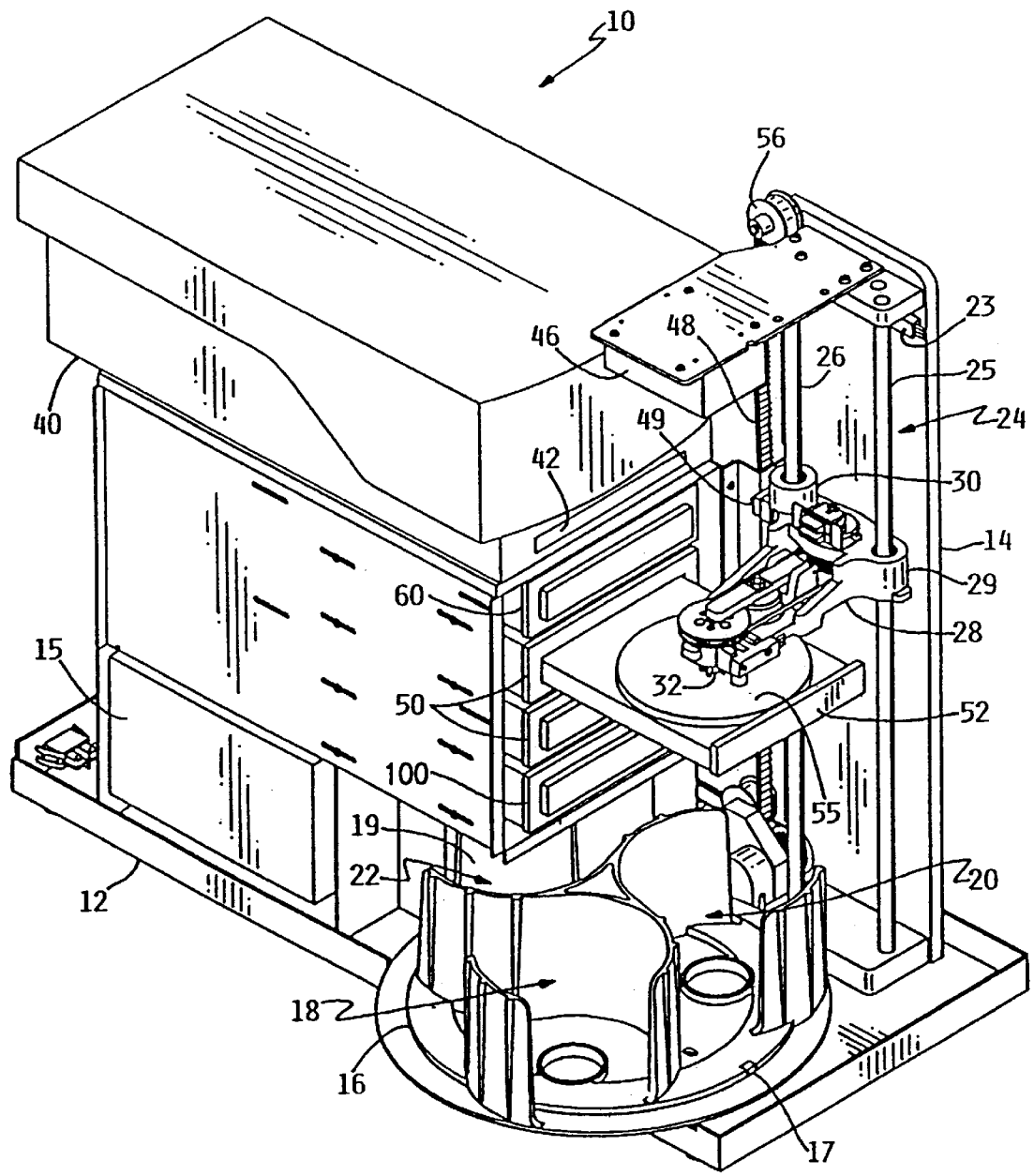
FIG. 1 shows the invention in front isometric view.

Referring to the Figures, transporter 10 has a base 12 and a vertical support frame 14. A carousel turntable 16 is rotatably mounted to base 12, and three CD bins 18, 20 and 22 are affixed to turntable 16. One of these bins functions as an input or supply bin, the second bin functions as an output bin, and the third bin functions as a reject collection bin. The carousel turntable 16 is rotatably controllable by a stepper or servo motor 19 which is connected to carousel turntable 16 by an endless loop belt beneath the base 12. The motor 19 is preferably positionable to three stop positions by a computer processor 15, which also controls the other functions to be hereinafter described, in conjunction with position sensors which are selectively placed to monitor positions of the various moving components. For example, carousel 16 has an index mark 17 which may be sensed by an optoelectric sensor (not shown) to detect the "home" position of carousel 16.

A carriage assembly 24 is affixed to base 12 by a pair of guide shafts 25, 26. Carriage assembly 24 has a carriage 28 which is slidably movable over guide shafts 25, 26 via a pair of yokes 29, 30 which have bearing surfaces to facilitate slidable movement. Carriage 28 is vertically movable from a lower position proximate turntable 16 to an upper "home" position aligned with the topmost component of transporter 10. An optoelectric sensor 23 is affixed proximate the upper end of frame 14 to detect when the carriage 28 is in its "home" position.

Figure 3:
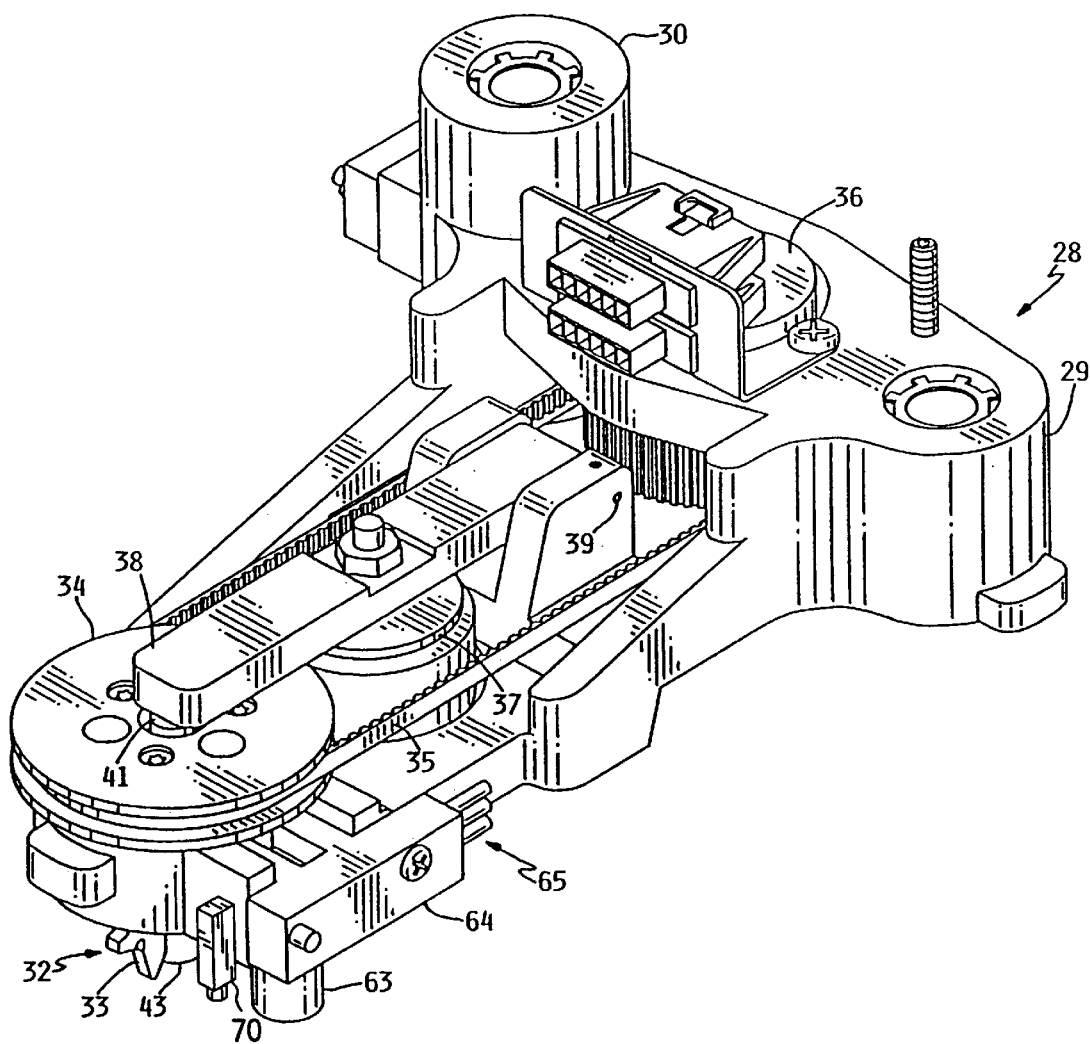
FIG. 3 shows an isometric view of the carriage.

Carriage 28 has a gripper 32 affixed to its underside, best seen with reference to FIG. 3. Gripper 32 has three expandable and contractible fingers 33 for insertion into the center hole of a CD and expanding to grasp the CD by its center hole for movement. The expansion and contraction of the gripper fingers 33 is controllable by a solenoid 37, and the solenoid 37 is controllable by the aforementioned computer processor 15. Solenoid 37 has an arm 38 which is pivotally movable about a pin 39. The distal end of arm 38 is contacts a downwardly directed rod 41 which passes through the center of the gripper fingers 33, and terminates in a conical head 43. Conical head 43 is sized to spread gripper fingers 33 apart when it is raised and to permit gripper fingers 33 to come together when it is lowered. Arm 38 is spring biased in an upward direction so as to cause conical head 43 to spread gripper fingers 33 apart in the normal or deactivated position, thereby providing a gripping force against a CD when the fingers 33 have been inserted into the CD center hole. When solenoid 37 is energized, arm 38 is pulled downwardly and conical head 43 permits gripper fingers 33 to come together, thereby releasing the holding force on a CD. A vertically-movable post 63 is located adjacent the gripper fingers 33 and is upwardly movable when the gripper fingers 33 are engaged into a CD, because the upper surface of the CD engages the post 63 and moves it upwardly. An optoelectric sensor 64 is positioned in carriage 28 to detect the upper position of post 63; the sensor 64 generates electrical signals which are coupled to the computer processor 15 via conductors 65 to signal the computer processor when a CD is engaged by the gripper fingers 33.

The rod 41 of gripper 32 is attached to a rotatable pulley 34. Pulley 34 may be rotated by a belt 35 connected to a gripper motor 36. Motor 36 is preferably a stepper motor which is controllable by the aforementioned computer processor 15 to rotatably align a CD which is gripped by gripper 32 for purposes which will be hereinafter described.

A printer 40 is positioned proximate the upper end of support frame 14, and printer 40 has an opening 42 positioned adjacent the path of travel of carriage 28. A printer drawer may be opened outwardly from opening 40, and may be pulled inwardly into printer 40, all under control of the computer processor 15. The drawer has a circular seat sized to receive a CD which may be deposited therein by selective movement of carriage 28 and gripper 32.

Printer 40 may be operated in conjunction with the rotatable pulley 34 and gripper 32, particularly in cases where certain information has been preprinted onto a CD surface, and the printer is to be used to print certain additional information related to the information stored on the CD. In such cases, it is important that the printer only print information on selected areas of the CD surface and not overprint on areas which have been preprinted. The motor 36 is activated to rotate pulley 34 and a gripped CD to rotatably align the CD for proper insertion into the printer 40. A camera 46 is affixed to the upper end of frame 14, and camera 46 has a downward field of view focused to image the CD surface when the CD is elevated to a proper position on the carriage 28. The video image of the CD surface is transformed into a digital bit map by the processor 15, and this digital bit map may be compared to a prestored bit map which is representative of the preferred rotatable position of the CD. If the viewed image does not correspond to the prestored bit map image, the motor 36 is activated to rotate the CD until a positive comparison is reached, at which position the CD is ready for insertion into the printer 40. This enables the processor 15 to recognize the preprinted material on the CD and then to rotatably position the CD to place the target print area on the CD in position for printing.

Alternatively, the camera 46 may be used in conjunction with processor 15 to read or verify printed information on the surface of the CD. This operation may be performed after a printing operation has been completed, as a check on the printing operation, or as an independent operation to read printed information on disks which may be loaded into the carousel bins.

One or more recorders 50 may be stacked in vertical arrangement adjacent to vertical frame 14, and each recorder 50 has a recorder drawer 52 which may be extended to receive a CD from gripper 32 on carriage 28. Each recorder 50 is equipped to record data on the CD in any format or arrangement dictated by the computer processor 15. FIG. 1 shows a recorder drawer 52 in an open position with the carriage 28 positioned to load or unload a CD into drawer 52.

A verifier 60 may also vertically stacked adjacent to frame 14. Verifier 60 has a drawer which operates similarly to that of recorder 50 to receive a CD from carriage 28. Verifier 60 functions to read the data stored on a CD, usually after a recorder 50 has completed its recording operation, and to verify the correctness of this data by comparison to the data prestored in the computer processor 15.

Figure 2:
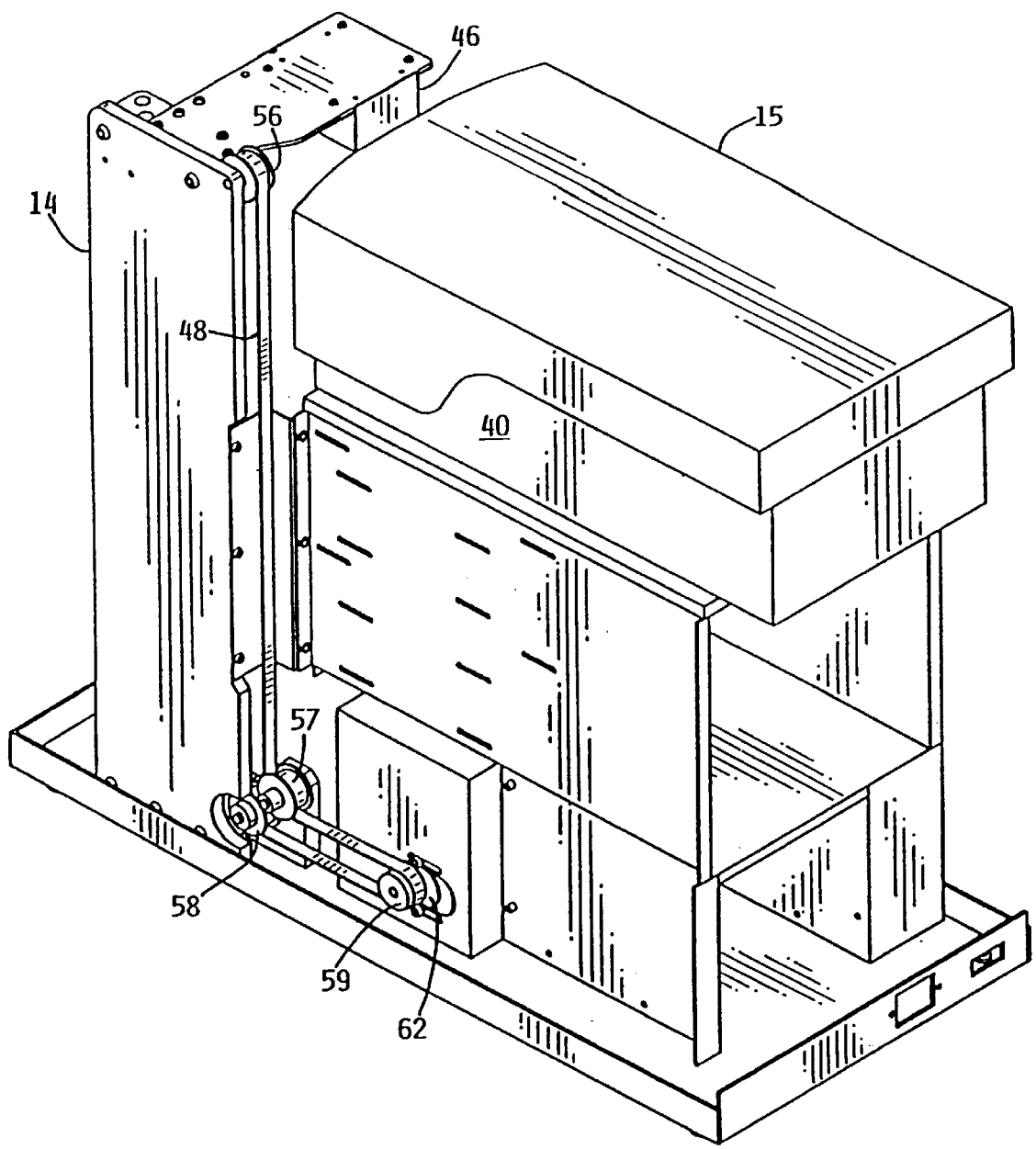
FIG. 2 shows the invention in rear isometric view.

FIG. 2 shows a rear isometric view of the transporter 10 to illustrate the carriage driving mechanism. A belt 48 is affixed to carriage 28 by a clamp 49 (FIG. 1), and belt 48 is threaded about pulleys 56, 57, 58, and a drive pulley 59. Drive pulley 59 is connected to a motor 62, which is selectively activated by computer processor 15 to cause the drive pulley 59 to rotate to a selected position or to rotate a predetermined number of turns. When motor 62 is activated, either forwardly or rearwardly, belt 48 moves to cause carriage 28 to move upwardly and downwardly. Pulley 58 is preferably connected to a position encoder (not shown) which monitors pulley rotation and, therefore, can detect the vertical position of carriage 28. The position encoder is electrically connected to computer processor 15 to provide carriage position signals to the processor.

In operation, the sequence of movements of the carriage relative to the various other devices may be varied to fit particular circumstances, the following summary being a representative sequence. Since the recording time for certain CD programs may vary from under ten to forty or more minutes, it is usually advisable to utilize several recorders operating at the same time with one verifier checking the recorded data from each CD after the recording operation is complete. For example, if three recorders are used, one recorder could be arranged to be at the start of a recording operation, a second recorder could be in the middle of a recording operation, and the third recorder could be finishing a recording operation. In such case, the carriage would be positioned to receive the newly recorded CD from the third recorder and would then deliver the CD to the verifier for checking. Since the verifier operation can be very fast, it could easily be completed before the second recorder finishes its recording operation. The verified CD could then be delivered by the carriage to the printer for label printing and then delivered by the carriage to the carousel output bin. If the printing operation took sufficient time, the carriage could return to the carousel input bin to retrieve the next CD for recording and then deliver this CD to the third recorder (now empty) before returning to the printer to retrieve the CD with the newly printed label. Of course, the carousel position is coordinated with whichever operation is next needed to position an input bin, an output bin, or a reject bin beneath the carriage.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A transporter apparatus for performing sequential recording and printing operations on compact discs, comprising:

a horizontal base frame and a vertical frame affixed thereto;

a moveable compact disc carrier positioned on the base frame, the compact disc carrier having at least two compact disc holding bins;

a carriage assembly affixed to the vertical frame, the carriage assembly having a vertically movable carriage, the carriage being vertically movable into a compact disc holding bin of the at least two compact disc bolding bins which is positioned directly beneath and vertically aligned with the carriage assembly, and the carriage assembly selectively attaching onto a compact disc of the compact discs located in the compact disc holding bin;

a plurality of vertically stacked devices positioned on the base frame and adjacent to a vertical path of movement of the carriage, at least a first one of the vertically stacked devices is a recorder for recording data on the compact discs, at least a second one of the vertically stacked devices is a printer for printing label information on the compact discs and each of the vertically stacked devices have an openable drawer which may be extended into a position beneath the carriage when the carriage is raised to an elevated position; and the carriage, the compact disc carrier, and the openable drawers of the vertically stacked devices are selectively moveable by a processor, the carriage is selectively activatable by the processor to sequentially move the compact disc between the compact disc holding bin and the vertically stacked devices for either recording the data on the compact disc or for printing the label information on the compact disc.

2. The apparatus of claim 1 wherein the compact disc carrier comprises a rotatable carousel having the at least two compact disc holding bins.

3. The apparatus of claim 1 wherein the carriage assembly further comprises at least one vertical guide wherein the carriage is slidably mounted to the guide.

4. The apparatus of claim 1 wherein the carriage further comprises a sensor for detecting a rotational position of the compact disc.

5. The apparatus of claim 4 wherein the sensor comprises a camera affixed to an upper end of the carriage assembly, the camera having a downward field of view toward the carriage.

6. The apparatus of claim 1 wherein the vertically movable carriage further comprises a gripper having a set of expandable gripper fingers connected to a pivotable arm for selectively attaching onto the compact disc.

7. The transporter apparatus of claim 1 wherein at least a third one of the vertically stacked device is a verifier for verifying the data recorded on the compact disc, an openable compact disc drawer of the verifier may be extended into another position beneath the carriage when the carriage is raised to the elevated position.

8. The apparatus of claim 1 wherein the transporter apparatus comprises the processor.

9. A compact disc vertical transporter comprising:

a base having two compact disc holding bins, the compact disc holding bins are moveable into alignment with a vertical transportation axis for positioning compact discs in axial alignment with the vertical transportation axis;

a plurality of compact disc processing devices vertically positioned above the base, a first one of the processing devices is a recorder for recording information on the compact discs, and a second one of the processing devices is a printer for printing label information on the compact discs, each of the processing devices has an openable compact disc drawer which may be extended into the vertical transportation axis;

a vertical carrier located directly above a compact disc holding bin of the two compact disc holding bins which is positioned in axial alignment with the vertical transportation axis, the vertical carrier for selectively coupling to a compact disc of the compact discs located in the compact disc holding bin and vertically raising the compact disc to an elevated position while maintaining the compact disc in axial alignment with the vertical transportation axis, the vertical carrier further selectively placing and retrieving the compact disc in the openable drawer of the processing devices while maintaining the compact disc in axial alignment with the vertical transportation axis; and the vertical carrier is selectively activatable by a processor to sequentially move the compact disc between the compact disc holding bin and the plurality of compact disc processing devices.

10. The compact disc vertical transporter of claim 9 wherein the base comprises a rotatable carousel having the at least two compact disc holding bins.

11. The compact disc vertical transporter of claim 9 wherein the vertical carrier comprises at least one vertical guide wherein a carriage is slidably mounted to the guide.

12. The compact disc vertical transporter of claim 9 wherein the vertical carrier comprises a sensor for detecting a rotational position of the compact disc.

13. The compact disc vertical transporter of claim 12 wherein the sensor comprises a camera affixed to an upper end of the vertical carrier, the camera having a downward field of view.

14. The compact disc vertical transporter of claim 12 wherein the vertical carrier comprises a gripper having a set of expandable gripper fingers connected to a pivotable arm for selectively attaching onto the compact disc.

15. The compact disc vertical transporter of claim 9 wherein a third one of the processing devices is a verifier for verifying the data recorded on the compact disc, an openable drawer of the verifier may be extended into the vertical transportation axis to receive the compact disc.

16. A method of operating a compact disc transporter, the compact disc transporter comprising a base having a compact disc supply bin and a compact disc receiving bin, the bins are moveable into alignment with a vertical transportation axis for positioning compact discs in axial alignment with the vertical transportation axis, a recorder vertically positioned above the base for recording information on the compact discs, a printer vertically positioned above the base for printing label information on the compact discs, the recorder and printer each have an openable compact disc drawer which may be extended into the vertical transportation axis, and a vertical carrier, the method comprising:

using the vertical carrier, selectively coupling a topmost compact disc of the compact discs located in the compact disc supply bin and vertically raising the compact disc along the vertical axis to an elevated position;

extending the compact disc drawer of the recorder into the vertical axis below the compact disc;

lowering the compact disc along the vertical axis and placing the compact disc into the compact disc drawer of the recorder;

recording the information onto the compact disc using the recorder;

removing the compact disc from the compact disc drawer of the recorder;

extending the compact disc drawer of the printer into the vertical axis below the compact disc;

lowering the compact disc along the vertical axis and placing the compact disc into the compact disc drawer of the printer;

printing the label information onto the compact disc using the printer;

removing the compact disc from the compact disc drawer of the printer; and lowering the compact disc along the vertical axis and placing in the disc receiving bin.

17. The method of claim 16 further comprising the step of rotatably aligning the compact disc to a preselected rotation position prior to placing the compact disc into the compact disc drawer of the printer.

18. The method of claim 17 wherein the compact disc is rotatably aligned using an image obtained from a camera.

19. The method of claim 16 wherein the step of selectively coupling the topmost compact disc comprises mechanically coupling the compact disc using a series of gripping fingers to engage a central hole in the compact disc.

20. The method of claim 16 wherein the compact disc supply bin and the receiving bin are integrally formed in a rotatable carousal.

21. The method of claim 16 wherein the compact disc transporter further comprises a verifier vertically positioned above the base for verifying information recorded on the compact discs, the method further comprises:

extending a compact disc drawer of the verifier into the vertical axis below the compact disc;

lowering the compact disc along the vertical axis and placing the compact disc into the compact disc drawer of the verifier; and verifying information stored on the compact disc using the verifier.

\* \* \* \* \*

UNITED STATES PATENT AND TRADEMARK OFFICE
CERTIFICATE OF CORRECTION

PATENT NO. : 5,914,918
DATED : 6/22/99
INVENTOR(S) : Lee et al.

It is certified that error appears in the above-identified patent and that said Letters Patent is hereby corrected as shown below:

On the title page, item [54] and Column 1:

In the title, line 4, delete "ADDING" and insert --HOLDING--, therefore.
In the abstract, line 15, delete "uses", and insert --used--, therefore.
In column 5, line 52, delete "device", and insert --devices--, therefore.
In column 6, line 36, delete "claim 12" and insert --claim 9--, therefore.

Signed and Sealed this

Twenty-fifth Day of April, 2000

Attest:

Q. TODD DICKINSON

Attesting Officer

Director of Patents and Trademarks